T. B. EIKER.
CARBURETER.
APPLICATION FILED AUG. 3, 1912.
1,103,178.
Patented July 14, 1914.
2 SHEETS—SHEET 2.
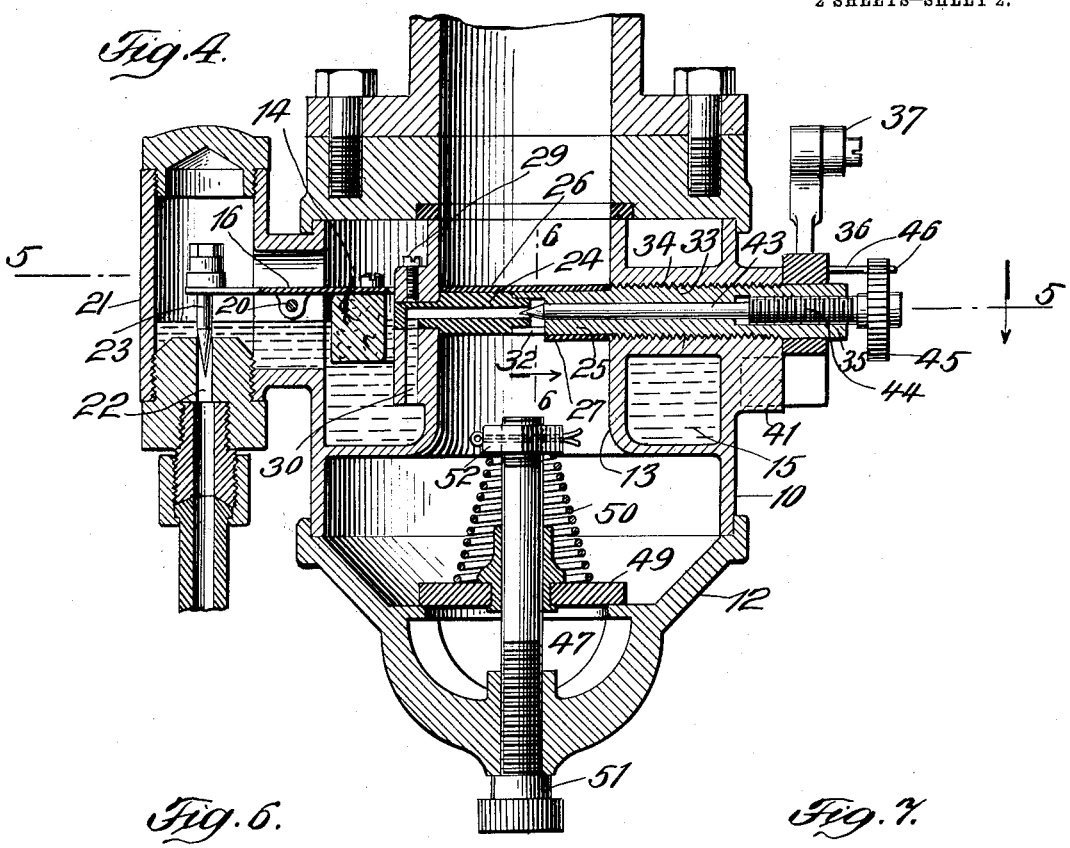
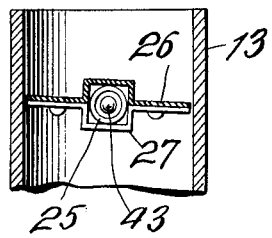
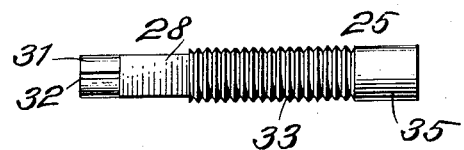
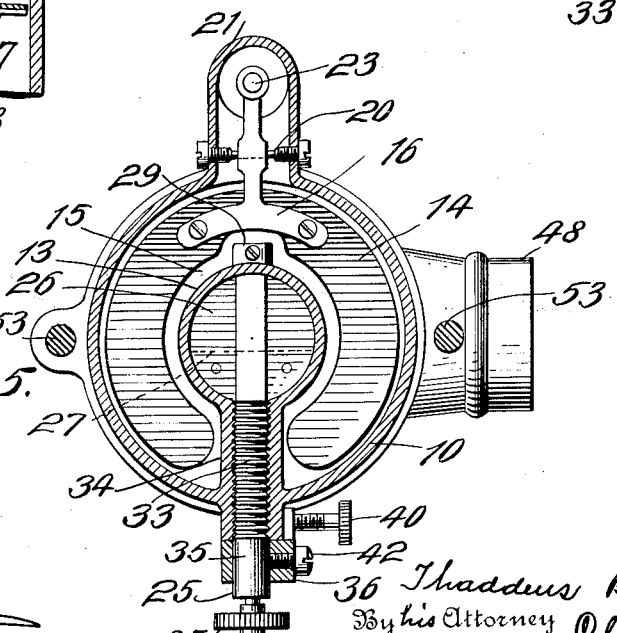

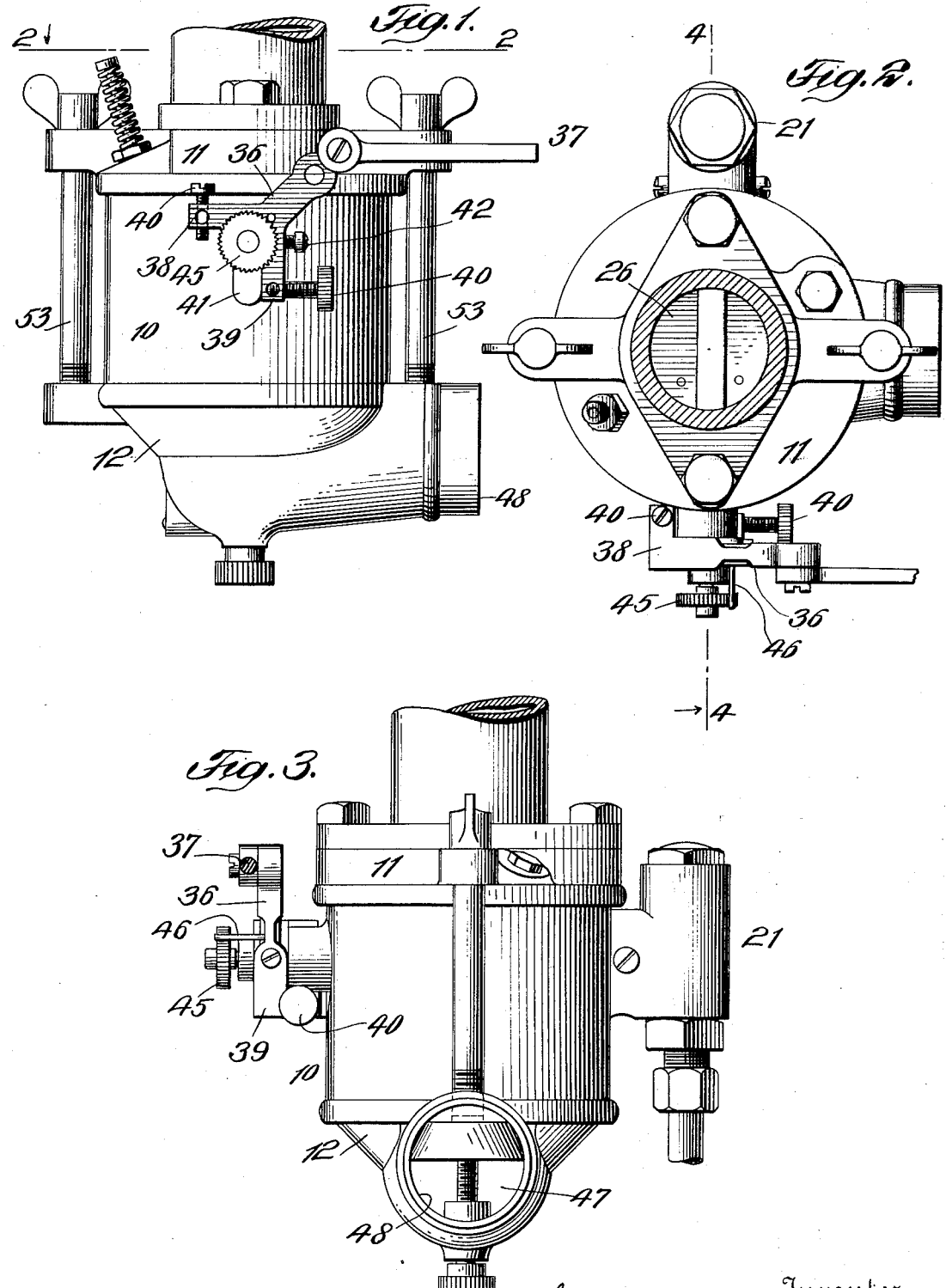

UNITED STATES PATENT OFFICE.

THADDEUS B. EIKER, OF ALLENHURST, NEW JERSEY.

CARBURETER.

1,103,178. Specification of Letters Patent. Patented July 14, 1914.

Application filed August 3, 1912. Serial No. 713,137.

*To all whom it may concern:*

Be it known that I, THADDEUS B. EIKER, a citizen of the United States, and a resident of Allenhurst, in the county of Monmouth and State of New Jersey, have invented certain new and useful Improvements in Carbureters, of which the following is a specification.

The invention relates to improvements in carbureters for hydrocarbon engines, and it consists in the novel features, arrangements and combinations of parts hereinafter described, and particularly pointed out in the claims.

The object of my invention is to provide a simple and highly efficient carbureter for automatically supplying gas of the requisite quantity and quality to the cylinder of an engine, in accordance with the work to be performed.

I contemplate the use of my carbureter in connection with the cylinders of automobile engines for supplying gas thereto.

The carbureter of my invention comprises preferably a cylindrical casing affording a carbureting chamber for the air and gas to be connected by suitable piping with the engine cylinder, and a receptacle for the gasolene, said receptacle surrounding the carbureting chamber and to be connected with a suitable tank or source of supply for the gasolene. The receptacle containing the gasolene will be provided with a float for closing, when the desired quantity of gasolene has entered said receptacle, a valve controlling the inflow of gasolene from the tank or other source of supply to the receptacle, and said receptacle will be connected by a suitable conduit and valve mechanism with the carbureting chamber of the carbureter, said valve mechanism being adapted to permit of a variable discharge of the gasolene in accordance with the requirements and preferably being located about the pivotal axis of and discharging below a suitable valve of the butterfly type employed for controlling the passage of air from the lower to the upper portion of said chamber. The carbureting chamber is provided at its lower portion with a suitable air inlet and an automatic check-valve therefor. The butterfly valve controlling the passage through the carbureting chamber and the valve or control mechanism for securing the variable discharge of the gasolene, are preferably connected together and operate synchronously to admit proper proportions of air and gasolene in accordance with the work required, whereby as the butterfly or air valve is turned to increase the opening through the carbureting chamber, the said control mechanism will likewise open to a greater extent to supply the requisite quantity of gasolene to the increased quantity of air then passing through the carbureter.

My invention results in the attainment of proper combustion, high efficiency in the engine and great economy in the consumption of the gasolene, as well as accomplishing other important advantages.

The invention and the preferred means for carrying the same into effect, will be fully understood from the detailed description hereinafter presented, reference being had to the accompanying drawings, in which:

Figure 1 is a side elevation of a carbureter constructed in accordance with and embodying my invention; Fig. 2 is a top view of the same, the pipe leading to the engine being in section on the dotted line 2—2 of Fig. 1; Fig. 3 is an elevation of the same, taken from the right hand sides of Figs. 1 and 2; Fig. 4 is a vertical section through the carbureter, taken on the dotted line 4—4 of Fig. 2; Fig. 5 is a horizontal section, on a smaller scale, taken on the dotted line 5—5 of Fig. 4; Fig. 6 is a detached vertical section through the upper portion of the carbureting chamber and butterfly valve therein, taken on the dotted line 6—6 of Fig. 4; and Fig. 7 is a detached side elevation of one member of the valve-mechanism controlling the discharge of gasolene to the carbureting chamber.

In the drawings 10 designates the exterior cylindrical shell or casing of the carbureter, 11 a top plate thereon, 12 a bottom cap applied thereto, 13 a vertical tubular section concentric with and within the said exterior casing and forming within it the carbureting chamber or conduit for the air and gas, and 14 a float within the gasolene receptacle 15 formed between the exterior casing 10 and tubular section 13, said float being connected to a plate 16 which is pivotally secured at 20 within a passage leading from a gasolene receptacle 21 connected with the casing 10. The gasolene for the supply of the carbureter enters the receptacle 21 through an inlet 22 controllable by a valve 23 in a well-known manner. I make no specific claim to the receptacle 21 since it furnishes merely an intermediate chamber through which the gasolene flows to the main gasolene receptacle 15. The movement of the float 14 operates through the pivoted plate 16, as the gasolene lowers in the receptacle 15, to open the valve 23 so that an additional supply of the gasolene may flow into the receptacle 15. When the float 14 is elevated by an admission of a proper quantity of gasolene to the receptacle 15, it acts to turn the outer end of the plate 16 downwardly within the receptacle 21 and permits or effects the seating of the valve 23 and the cutting off of any further supply of gasolene through the inlet 22.

The outlet for gasolene from the receptacle 15 to the carbureting chamber in the tubular section 13 is through the tubular valve-member 24 and tubular valve-member 25, to the latter of which a butterfly valve 26 is connected by means of a strap or plate 27, said valve 26 normally extending transversely across the carbureting chamber and being seated on a square or polygonal portion 28 of said tubular member 25. The strap or plate 27 engages the lower side of the square portion 28 of the tubular member 25, as more clearly shown in Fig. 6, and is riveted to said valve 26. The tubular valve member 25 is adapted to have a rotary motion and in doing so to tilt the valve 26 in controlling the passage of air and gasolene through the carbureting chamber to the upper side of said valve. The valve 26 and strap 27 are not rigidly fastened to the tubular member 25, but are mounted thereon and the valve 26 moves therewith during the rotary motion of said member 25, but in the construction presented the member 25 also has imparted to it a limited longitudinal movement, and during this movement the square portion 28 of said member has a sliding action between the valve 26 and strap or plate 27. The tubular valve member 24 is rigid with the casing 13, being secured to it by means of a screw 29, and said member 24 is open at both ends, its outer end being in communication with a conduit or vertical opening 30 extending upwardly from within the receptacle 15 to said member 24, as shown in Fig. 4. The tubular valve member 24 extends transversely of the carbureting chamber and to about the vertical center thereof, where it is engaged with the inner tubular end 31 of the member 25 with which it coacts, said end 31 being formed in its lower side with a slot 32 (Fig. 7) which constitutes the final outlet for the gasolene to the carbureting chamber. I preferably annularly reduce the inner end of the tubular member 24 to receive the end 31 of the member 25, as shown in Fig. 4, thus leaving a substantially uniform surface to receive the butterfly valve 26. The tubular member 24 is circular in cross-section, and hence when the valve member 25 is turned and carries the valve 26 with it, said valve may readily turn on the surface of the member 24. The tubular valve member 25 has a threaded intermediate section 33 held within an internally threaded section 34 constituting a portion of the main casing 10, and said member 25 has at its outer end a non-threaded portion 35 upon which is secured a crank 36 to which an operating rod 37 is connected and which is preferably formed with two arms 38, 39 standing at right angles to each other and each carrying an adjusting or stop-screw 40 adapted on the movement of said crank 36 to engage a stationary stop 41 on the casing 10 and thereby limit the action of the crank 36. The throw of the crank-arm 36 may be regulated at will by the proper adjustment of the stop-screws 40.

The arm 36 is fastened, as by a screw 42, to the valve-member 25, and hence when said arm is actuated from the operating rod 37, it will turn the valve-member 25 in one direction or the other in accordance with the direction of movement of said arm, and this turning or rotary movement of the tubular valve-member 25 effects, through the engaging threads on the same and the section 34 of the main casing, a longitudinal travel of said member toward or from the valve-member 24 and the consequent enlargement or reduction of the opening through the slot 32 at the inner end of the valve-member 25. When the valve-member 25 travels outwardly in a direction from the valve-member 24 the internal space between the facing inner ends of said valve members is enlarged, and a more extended portion of the slot 32 becomes exposed in view of the travel of the end 31 with the valve member 25 in a direction outwardly from the valve-member 24. When the valve-member 25 is turned to travel inwardly toward the valve-member 24, as when a less quantity of gasolene is required, the end 31 of said member 25 travels upon the end of the valve-member 24 and the latter closes off a portion of the slot 32. I contemplate that at all times a portion of the slot 32 shall be open for the escape of gasolene. The longitudinal movement of the valve-member 25 serves to aid in controlling the feed of gasolene into the carbureting chamber, but in order to obtain absolute satisfaction in feeding the gasolene and certainty in the operation of the carbureter for all makes of engines, I provide within the tubular member 25 a needle-valve 43 which extends longitudinally through said valve member 25 and has its pointed end arranged to enter the inner end of the opening through the valve member 24 and to more or less close said opening under the varying requirements of the engine employing the carbureter. The needle-valve 43 is provided with a threaded section 44 engaging an internal thread formed within the member 25, and said needle-valve is provided at its outer end with an operating head or wheel 45 by which the valve may be given an independent longitudinal movement within the tubular member 25 in first adjusting the carbureter to the engine, and thereafter be given rotary movements synchronously with the rotary movements of the tubular member 25, and also a longitudinal traveling movement with the said valve member 25. The needle-valve 43 is given a primary adjustment according to the needs of the engine, and thereafter it is at all times stationary in its relation with the valve-member 25 and turns and moves longitudinally therewith. When the valve-member 25 moves outwardly in a direction from the valve-member 24 the needle-valve moving with said valve member 25 enlarges the discharge opening from the inner end of the valve-member 24, and when said valve-member 25 moves inwardly toward said valve-member 24 the needle-valve 43 by entering the discharge opening from said member 24 partly closes the same, and in that way restricts the escape of gasolene therefrom. In order that there may be no tendency whatever for the valve-member 25 to turn on the needle valve 43, I provide the wheel or head 45 with a serrated edge and engage this edge with an arm 46 extending from the crank 36 so that with every movement of said crank tending to turn the valve member 25 the wheel 45 and needle-valve 43 will receive a corresponding movement.

The butterfly-valve 26 is operated from the tubular valve-member 25, and hence with every turning motion of said valve-member the butterfly valve will be more or less opened or closed. When the valve-member 25 is moved to increase the discharge of gasolene, this action will open the butterfly valve 26 proportionately, and when the valve-member 25 is turned to close off a part of the discharge of gasolene it will, at the same time, proportionately close the valve 26, and hence by the primary adjustment of the needle-valve 43 and the regulatable discharge of gas and air into the carbureting chamber, I am enabled to supply the engine with gas of the requisite quantity and quality in accordance with the work to be performed.

The upper or cap plate 11 has a central bore constituting a continuation of the carbureting chamber. The bottom cap 12 contains an inlet and drain chamber 47 formed with a laterally disposed tubular member 48 which forms the inlet for air to the lower end of the carbureter. The chamber 47 is below a check-valve 49 which is normally held on its seat by a coiled spring 50. During the use of the carbureter the valve 49 will be automatically opened to a greater or less extent, as may be required, by the suction created by the piston of the engine on its suction strokes. The spring 50 is held against the valve 49 by an adjustable stem 51 and nut 52.

The top and bottom plates 11, 12 may be removably clamped against the ends of the casing 10 by means of suitable rods 53 or by other convenient means.

The operation of the carbureter will be understood from the foregoing description without further extended detailed explanation.

The carbureter having been applied to position, and the receptacle 15 having been supplied with gasolene, the operation of the air or butterfly-valve 26 and the gasolene discharge valve mechanism below said butterfly-valve will be under the control of the driver on the car through the medium of the connecting rod 37, crank 36 and valve member 25, this valve member carrying the butterfly-valve and constituting one member of the gasolene discharge valve mechanism. The suction stroke of the piston of the engine will be depended on, in the form of my invention illustrated, for opening the air valve 49. The driver will open the butterfly-valve 26 and the valve mechanism controlling the discharge of gasolene to a greater or less extent, as the requirements of the engine may demand. It is one of the important features of the invention that the driver may regulate the quantity of gasolene that shall escape to the carbureting chamber and that at the same time he may control by the position of the valve 26 the quantity of air in said chamber to mix with the gasolene. I designedly locate the discharge orifice for gasolene to the carbureting chamber below the valve 26, which location for said discharge orifice I find in the construction presented herein, to be of advantage in securing the proper mixture of the gasolene and air and efficiency in the engine. The valve 26 will normally be left slightly tilted so as to permit a certain quantity of air to be drawn upwardly above the same, and in the use of the carbureter the said valve will of course be more or less opened as requirements may demand, and the opening for the discharge of the gasolene will be controlled accordingly. The initial adjustment of the carbureter to the engine will be accomplished through the needle-valve 43, and thereafter, as hereinbefore explained, the needle-valve 43 and valve-member 25 will both rotate and travel together when actuated by the driver through the rod 37 and intermediate connections.

I do not limit my invention to all of the details of form and construction hereinbefore described, since obviously the same may be modified in many respects without departing from the spirit of the invention.

What I claim as my invention and desire to secure by Letters-Patent, is:

1. A carbureter comprising a casing, a carbureting-chamber therein for the air and gasolene or the like, a valve controlling the passage of air and gas through said chamber, a gasolene supply pipe leading transversely into said chamber from one side thereof, a rotary gasolene discharge member leading into said chamber from the other side thereof and coacting with said supply pipe, a needle valve in said discharge member with its point set in proper initial relation to the outlet from said supply-pipe, and means for moving said discharge member and its needle-valve longitudinally to vary the discharge of gasolene and coöperatively moving said controlling valve.

2. A carbureter comprising a casing, a carbureting-chamber therein for the air and gasolene or the like, a valve controlling the passage of air and gas through said chamber, a gasolene supply pipe leading transversely into said chamber from one side thereof, a rotary gasolene discharge member leading into said chamber from the other side thereof and coacting with said supply pipe, means connecting said controlling valve with said rotary discharge member for coöperative action therewith, means for imparting rotary movement to said discharge member, and means for moving said discharge member longitudinally during its rotation to vary the discharge of gasolene and comprising interengaging screw threads on said member and the part of said casing receiving it.

3. A carbureter comprising a casing, a carbureting-chamber therein for the air and gasolene or the like, a valve controlling the passage of air and gas through said chamber, a gasolene supply pipe leading transversely into said chamber from one side thereof, a rotary gasolene discharge member leading into said chamber from the other side thereof and coacting with said supply pipe, means connecting said controlling valve with said rotary discharge member for coöperative action therewith, means for imparting rotary movement to said discharge member, and means for moving said discharge member longitudinally during its rotation to vary the discharge of gasolene and comprising interengaging screw threads on said member and the part of said casing receiving it, combined with a needle-valve in said discharge member with its point set in proper initial relation to the outlet from said supply-pipe, said needle-valve being connected with said discharge-member to move longitudinally therewith toward and from said supply-pipe.

4. A carbureter comprising a casing, a carbureting chamber therein for air and gasolene or the like, a valve controlling the passage through said chamber, a gasolene supply and valve mechanism within said chamber at the lower side of said valve comprising a supply pipe member having an outlet at its inner end for gasolene and a coöperative movable member connected with said controlling valve, and means for rotating said movable member and imparting longitudinal movement thereto for varying the discharge of gasolene coöperatively with the movement of said controlling valve, the discharge for gasolene being at the lower side of said controlling valve.

5. A carbureter comprising a casing, a carbureting chamber therein for air and gasolene or the like, a valve controlling the passage through said chamber, a receptacle for gasolene or the like exterior to said chamber, a supply pipe leading from said receptacle into said chamber and having an opening at the inner end thereof for the escape of the gasolene below said valve, a rotary discharge valve member connected with said controlling valve for operating the same and coöperating with the inner end of said supply pipe, and means for rotating said discharge member and moving the same longitudinally toward and from the inner end of said supply pipe for varying the discharge of gasolene coöperatively with the position of said controlling valve, combined with a needle valve in said discharge member with its point set in proper initial relation to the outlet from said supply pipe, said needle valve being connected with said discharge member to move longitudinally therewith toward and from said supply pipe.

6. A carbureter comprising a casing, a carbureting chamber therein for air and gasolene or the like, a valve controlling the passage through said chamber, a receptacle for gasolene or the like exterior to said chamber, a pipe extending transversely into said chamber at one side thereof from said receptacle directly below said controlling valve and having at its inner end an outlet opening for gasolene, a rotary discharge valve member leading into said chamber from the other side thereof for coöperation with the inner end of said supply pipe to vary the discharge of gasolene, means connecting said controlling valve with said discharge member, and means for simultaneously rotating and longitudinally moving said discharge member, said discharge member having a needle valve therein with its points set in proper initial relation to the outlet from said supply pipe, and said needle valve being connected with said discharge member to move longitudinally therewith toward and from said pipe.

7. A carbureter comprising a casing, a carbureting chamber therein for air and gasolene or the like, a valve controlling the passage through said chamber, a receptacle for gasolene or the like exterior to said chamber, a supply pipe extending transversely into said chamber at one side thereof from said receptacle directly below said controlling valve and having at its inner end an outlet opening for gasolene, a rotary discharge valve member leading into said chamber from the other side thereof for coöperation with the inner end of said supply pipe to vary the discharge of gasolene, means connecting said controlling valve with said discharge member, and means for simultaneously rotating and longitudinally moving said discharge member, said rotary discharge member having thereon a tubular end containing a discharge slot and telescopically engaging the end of said supply pipe.

Signed at New York city, in the county of New York and State of New York, this 2nd day of August A. D. 1912.

THADDEUS B. EIKER.

Witnesses:
CHARLES C. GILL,
ARTHUR MARION.